United States Patent
Dlugai et al.

(10) Patent No.: US 8,282,288 B2
(45) Date of Patent: Oct. 9, 2012

(54) DOUBLE-ROW WHEEL BEARING UNIT

(75) Inventors: Darius Dlugai, Schweinfurt (DE); Dirk Holweger, Wuerzburg (DE); Peter Niebling, Bad Kissingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 602 days.

(21) Appl. No.: 12/515,163

(22) PCT Filed: Nov. 9, 2007

(86) PCT No.: PCT/DE2007/002026
§ 371 (c)(1),
(2), (4) Date: May 15, 2009

(87) PCT Pub. No.: WO2008/058512
PCT Pub. Date: May 22, 2008

(65) Prior Publication Data
US 2010/0054646 A1    Mar. 4, 2010

(30) Foreign Application Priority Data
Nov. 18, 2006  (DE) .......................... 10 2006 054 497

(51) Int. Cl.
*F16C 19/18*  (2006.01)
(52) U.S. Cl. .......................... 384/544; 384/490; 384/589
(58) Field of Classification Search .................. 384/589, 384/490, 544, 512, 504
See application file for complete search history.

(56) References Cited

U.S. PATENT DOCUMENTS

| 5,226,737 | A * | 7/1993 | Sandy, Jr. ...................... 384/512 |
| 6,769,809 | B2 * | 8/2004 | Maret ............................ 384/512 |
| 7,104,695 | B2 * | 9/2006 | Shevket ......................... 384/450 |
| 7,997,803 | B2 * | 8/2011 | Mock et al. ................... 384/544 |
| 2002/0186910 | A1 * | 12/2002 | Maret ............................ 384/513 |
| 2005/0111771 | A1 * | 5/2005 | Shevket ......................... 384/544 |
| 2007/0104404 | A1 * | 5/2007 | Niebling et al. .............. 384/504 |

FOREIGN PATENT DOCUMENTS
DE        200 23 425       2/2004
WO       2005/008086       1/2005

* cited by examiner

*Primary Examiner* — Patrick MacKey
(74) *Attorney, Agent, or Firm* — Lucas & Mercanti, LLP; Klaus P. Stoffel

(57) ABSTRACT

The invention relates to a double-row wheel bearing unit for a vehicle, comprising an axle journal fixed to the vehicle, and a wheel hub bearing a wheel flange rotatably mounted on said axle journal by means of two rows of rolling bodies spaced axially apart. In order to adapt the loading capacity of the rows of rolling bodies to the respective load conditions, the two rows of rolling bodies have different rolling circle diameters respectively adapted to the highest expected load.

11 Claims, 2 Drawing Sheets

(12)United States Patent
US 8,282,288 B2

DOUBLE-ROW WHEEL BEARING UNIT

This application is a 371 of PCT/DE2007/002026 filed Nov. 9, 2007, which in turn claims the priority of DE 10 2006 054 497.8 filed Nov. 18, 2006, the priority of both applications is hereby claimed and both applications are incorporated by reference herein.

FIELD OF THE INVENTION

The invention relates to a double-row wheel bearing unit for a vehicle, comprising a bearing journal which is fixed to the vehicle and a wheel hub which carries a wheel flange and is mounted rotatably on said bearing journal by means of two rolling body rows which are spaced apart axially.

BACKGROUND OF THE INVENTION

Wheel bearing units of this type are used, in particular, to mount the nondriven wheels of motor vehicles. They are designed in such a way that they can absorb the loads which occur during operation, for example the radial load which is caused by the vehicle weight and the tilting moments about a perpendicular axis with respect to the wheel bearing axis, which tilting moments occur, for example, when driving around bends. In the case of a appropriate design of the rolling body rows, for example, as angular contact roller bearings or as angular contact ball bearings, said wheel bearing units are also capable of absorbing the axial forces which occur during operation.

The website kfz-tech.de/Radlager.htm shows a typical wheel bearing unit of the type which is mentioned in the preamble of claim 1, with an outer rolling body row which is close to the wheel flange and an inner rolling body row which is remote from the wheel flange. The structural stipulations, that is to say the dimensions of a bearing journal and of the wheel hub which is adapted to the largely standardized wheel rims, but also questions of part store management at the manufacturer and spare part store management at the repair company in effect suggest to configure the two rolling body rows identically. However, on account of their different spacing from the wheel flange, the two rolling body rows are loaded differently by the moments and forces which are introduced into the wheel bearing unit via said wheel flange, with the result that they are subjected to different wear and therefore have a different service life. Wheel bearing units of this type therefore already have to be replaced when the less loaded rolling body row has not yet reached the end of its theoretically possible service life.

OBJECT OF THE INVENTION

The invention is based on the object of providing a wheel bearing unit of the type which is mentioned in the preamble of claim 1, which wheel bearing unit is better adapted to the respective loading conditions in a vehicle, so that a largely uniform wear of both rolling body rows arises.

SUMMARY OF THE INVENTION

The invention is based on the finding that the load-bearing capability of antifriction bearings is, among others, also a function of the bearing diameter, with the result that an adaptation to the loading conditions is possible by a suitable selection of the pitch circle diameters of the rolling body rows, without otherwise intervening to a more pronounced extent in the construction which is conditional on the above-mentioned stipulations.

US 2005/0111771 A1 discloses a double-row wheel bearing unit for a vehicle, in which wheel bearing unit the inner ring arrangement for the two rolling body rows is configured as a rotating wheel flange, while the outer ring arrangement is arranged in a rotationally fixed manner on the vehicle body. In this known wheel bearing unit, the pitch circle diameter of the axially outer rolling body row is enlarged with respect to the pitch circle diameter of the axially inner rolling body row. In this way, the center of pressure $P_0$ is to be displaced to such an extent to the outside and the lever arm length is to be enlarged with regard to the introduced force $F_R$ to such an extent that the reaction force $F_{VR}$ is equal to the reaction force $F_{V1}$ of the axially inner rolling body row. Accordingly, this is a structural measure, in order to match the loads which act on the two rolling body rows and therefore the service life to be expected of the two rolling body rows to one another.

The invention therefore proceeds from a double-row wheel bearing unit for a vehicle, comprising a bearing journal which is fixed to the vehicle and a wheel hub which carries a wheel flange and is mounted rotatably on said bearing journal by means of two rolling body rows which are spaced apart axially. Furthermore, there is provision here for the two rolling body rows to have different pitch circle diameters, in such a way that the load-bearing capability of the rolling body rows corresponds to the respective actual loads. In contrast to the above-mentioned US patent document, it is not the loading but rather the load-bearing capability of the two rolling body rows which is adapted in the present invention to the structurally stipulated loading conditions, in order to arrive at the same goal.

There is provision according to one preferred refinement of the invention for the axially outer rolling body row in relation to the free end of the bearing journal to be arranged substantially in the plane of the wheel flange, with the result that said outer rolling body row mainly has to absorb only radial forces which are caused by the vehicle weight, but is substantially not loaded by tilting forces which act on the wheel.

There is provision according to one refinement of the invention for the pitch circle diameter of the axially inner rolling body row in relation to the free end of the bearing journal to be greater than the pitch circle diameter of the outer rolling body row. The load-bearing capability of the inner rolling body row is therefore also greater than that of the outer rolling body row. An arrangement of this type lends itself, for example, to racing cars or the like which have a low weight, but drive through bends at high speed, with the result that high tilting moments act on the wheels.

According to another refinement of the invention, the pitch circle diameter of the inner rolling body row is smaller than the pitch circle diameter of the outer rolling body row. The load-bearing capability of the outer rolling body row which is close to the wheel flange is greater than that of the inner rolling body row which is remote from the wheel flange. An arrangement of this type lends itself, for example, to heavy trucks, in which the outer rolling body row has to absorb a greater part of the transverse force which is introduced via the wheel flange.

An increase in the pitch circle diameter can also be achieved via an increase in the diameter of the rolling bodies themselves. The above-described effects can therefore also be achieved by the fact that, as a function of the respective loading conditions, the rolling body diameter of the inner rolling body row is smaller or greater than the rolling body diameter of the outer rolling body row, as is explained using an exemplary embodiment.

According to the invention, at least one of the rolling body rows is a ball row, the ball row or the ball rows each being configured as angular contact ball bearing rows, so that the wheel bearing unit can also absorb axial forces, with the result that a separate axial bearing can be dispensed with. According to one preferred refinement of the invention, the two rolling body rows are configured as angular contact ball bearing rows with loading lines of action which are directed against one another.

A structural simplification of the wheel bearing unit can be achieved by the fact that the wheel hub is configured as an outer ring for the two rolling body rows, the raceways of the two rolling body rows being machined directly into the inner wall of the wheel hub. For reasons of mounting technology, the two rolling body rows are each assigned separate inner rings which are seated on the bearing journal.

BRIEF DESCRIPTION OF THE DRAWINGS

In the following text, the invention will be explained in greater detail using some exemplary embodiments and with reference to the appended drawing, in which.

DETAILED DESCRIPTION OF THE DRAWINGS

Figure 1:
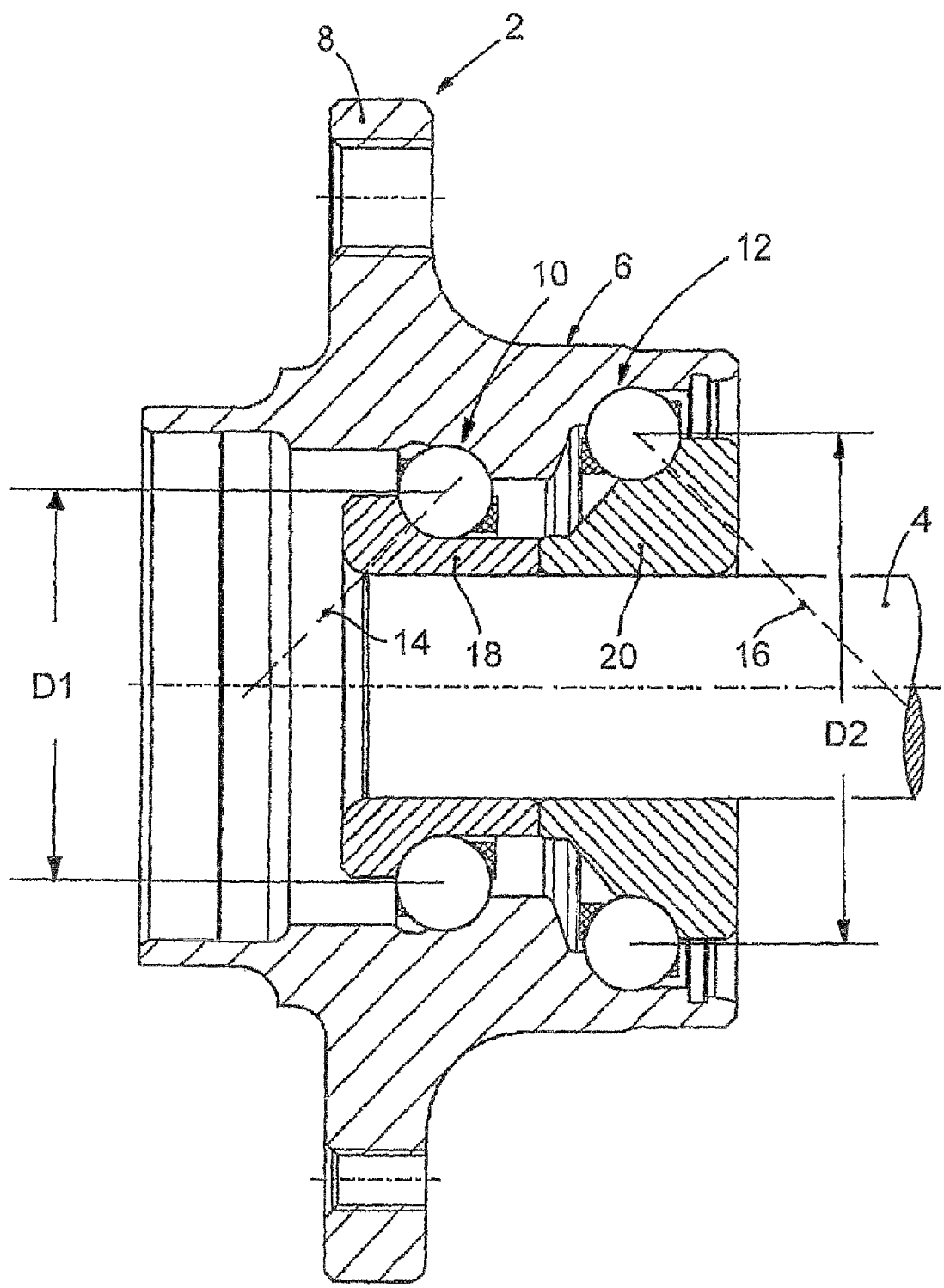
FIG. 1 shows a longitudinal section through a wheel bearing unit.

The wheel bearing unit which is shown in FIG. 1 comprises a bearing journal 4 which is fixed to the vehicle and a wheel hub 6 which is mounted rotatably on said bearing journal 4 and carries a wheel flange 8, to which a wheel rim (not shown) can be screwed fixedly in a manner which is known per se. The wheel hub 6 is mounted rotatably by means of two rolling body rows which are spaced apart axially, namely an outer rolling body row 10 which is close to the wheel flange and an inner rolling body row 12 which is remote from the wheel flange. In the present exemplary embodiment, the rolling body rows 10, 12 are configured as angular contact ball rows with loading lines of action 14 and 16, respectively, which are inclined against one another.

Each of the two rolling body rows 10 and 12 has a dedicated inner ring 18 and 20, respectively, which is seated on the bearing journal 4. The wheel hub 6, serves as common outer ring for the rolling body rows 10 and 12, on the inner wall of which corresponding raceways are formed for the rolling bodies.

As can be seen in FIG. 1, the outer rolling body row 10 is arranged substantially in the plane of the wheel flange 8. For mounting reasons, the pitch circle diameter D1 of the outer rolling body row 10 is restricted by the smallest internal diameter below the rim seat on the wheel flange. Its inner ring 18 is guided through below the rim seat during the bearing mounting. The pitch circle diameter D2 of the inner rolling body row 12 is substantially not restricted, with the result that it can be greater than the pitch circle diameter D1.

As has already been described in the above text, the wheel bearing unit which is shown in FIG. 1 is designed substantially for fast, sporty vehicles, the weight of which is comparatively low, however, on the wheels of which cars high tilting moments act when driving fast around bends.

Figure 2:
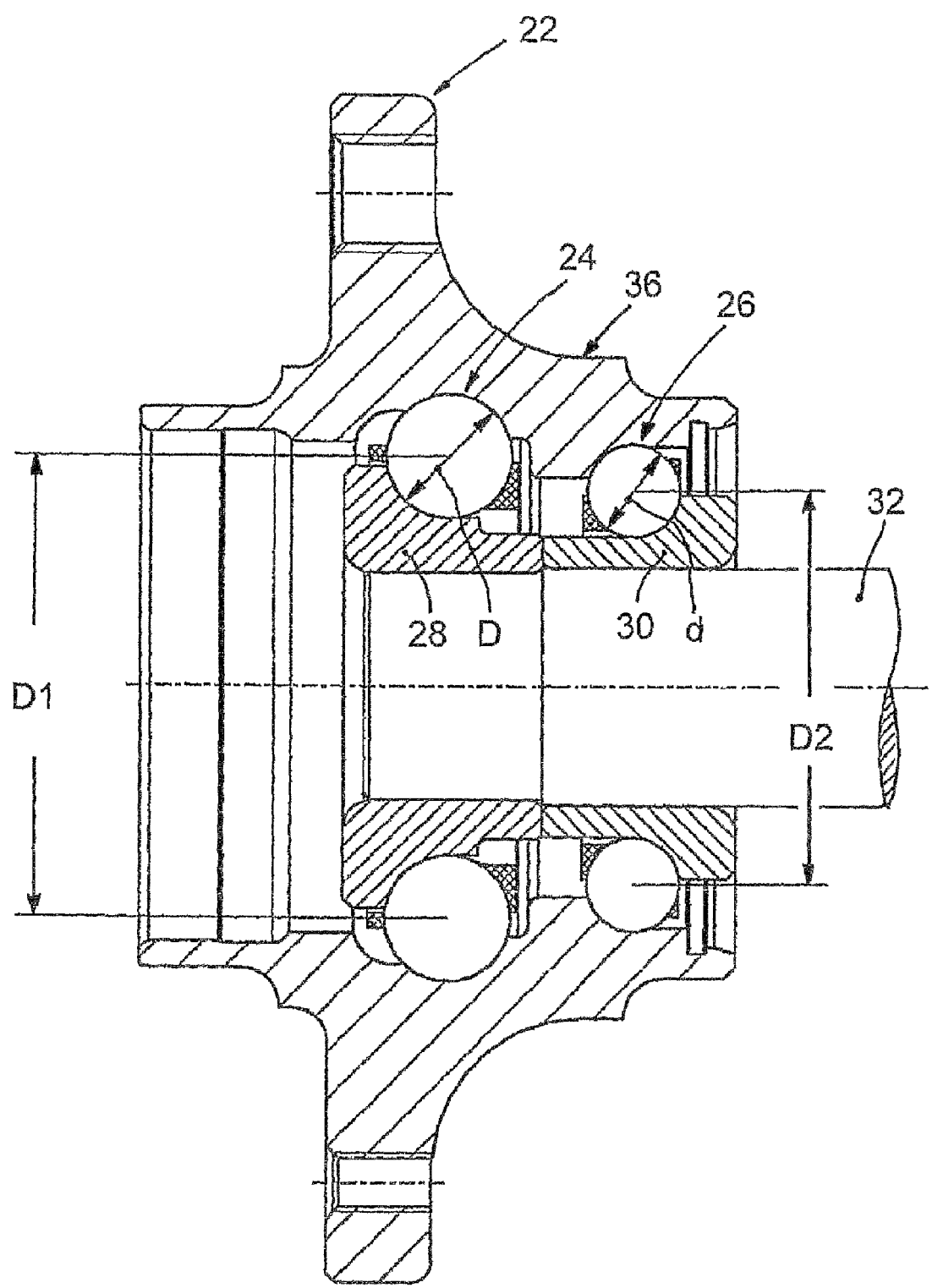
FIG. 2 shows a longitudinal section through a wheel bearing unit in another refinement.

FIG. 2 shows a wheel bearing unit 22 similar to that in FIG. 1, which wheel bearing unit 22 differs from the latter, however, in the design of the two rolling body rows, as will be explained in the following text. The outer rolling body row 24 which is close to the wheel flange and the inner rolling body row 26 which is remote from the wheel flange are each arranged on the stepped bearing journal 32 via associated inner rings 28 and 30, respectively, with slightly different internal diameters. The outer ring which is common to both rolling body rows 24 and 26 is formed by the wheel hub 36 which carries the wheel flange 34, as in the example of FIG. 1.

In order to increase the load-bearing capability of the outer rolling body row 24 in comparison with that of the inner rolling body row 26, the outer rolling body row 24 is fitted with balls of greater diameter D than the diameter d of the inner rolling body row 26, which also results in a pitch circle diameter D1 which is greater than the pitch circle diameter D2 of the inner rolling body row 26.

As has already been mentioned in the preceding text, a wheel bearing unit of the design shown in FIG. 2 is designed predominantly for heavy vehicles, in which it is the radial force which acts on the wheel bearing unit and not tilting moments which act on the wheels which is decisive.

LIST OF DESIGNATIONS

2 Wheel bearing unit
4 Bearing journal
6 Wheel hub
8 Wheel flange
10 Rolling body row (outer)
12 Rolling body row (inner)
14 Loading line of action
16 Loading line of action
18 Inner ring
20 Inner ring
22 Wheel bearing unit
24 Rolling body row (outer)
26 Rolling body row (inner)
28 Inner ring
30 Inner ring
32 Bearing journal
34 Wheel flange
36 Wheel hub
D1 Pitch circle diameter
D2 Pitch circle diameter
D Rolling body diameter
d Rolling body diameter

The invention claimed is:

1. A double-row wheel bearing unit for a vehicle, comprising:
a bearing journal which is fixed to a chassis of the vehicle;
a wheel hub having a wheel flange mounted rotatably on said bearing journal, the wheel hub rotating independent of the bearing journal; and
two rolling body rows, an inner rolling body row and an outer rolling body row, which are spaced apart axially and arranged between the wheel hub and the bearing journal such that the bearing journal is spaced radially from the wheel hub by the two rolling body rows,
wherein the two rolling body rows each have a different pitch circle diameter.

2. The wheel bearing unit as claimed in claim 1, wherein the outer rolling body row, in relation to a free end of the bearing journal, is arranged substantially in a plane of the wheel flange.

3. The wheel bearing unit as claimed in claim 1, wherein the pitch circle diameter of the inner rolling body row, in relation to a free end of the bearing journal, is greater than the pitch circle diameter of the outer rolling body row.

4. The wheel hearing unit as claimed in claim 1, wherein the pitch circle diameter of the inner rolling body row is smaller than the pitch circle diameter of the outer rolling body row.

5. The wheel bearing unit as claimed in claim 1, wherein inner rolling body row is comprised of a plurality of rolling bodies having a first rolling body diameter and the outer rolling body row is comprised of a plurality of rolling bodies having a second rolling body diameter, which is greater than the first rolling body diameter of the rolling bodies that comprise the inner rolling body row.

6. The wheel bearing unit as claimed in claim 1, wherein the inner rolling body row is comprised of a plurality of rolling bodies having a first rolling body diameter and the outer rolling body row is comprised of a plurality of rolling bodies having a second rolling body diameter, which is smaller than the first rolling body diameter of the rolling bodies that comprise the inner rolling body row.

7. The wheel bearing unit as claimed claim 1, wherein at least one rolling body row is a ball row.

8. The wheel bearing unit as claimed in claim 7, wherein each ball row is configured as an angular contact ball bearing row.

9. The wheel bearing unit as claimed in claim 8, wherein the two rolling body rows are configured as angular contact ball bearing rows with loading lines of action which are inclined against one another.

10. The wheel hearing unit as claimed in claim 1, wherein the wheel huh is configured as an outer ring for the two rolling body rows.

11. The wheel bearing unit as claimed in claim 1, wherein the two rotting body rows each have a separate inner ring seated on the bearing journal.

* * * * *